(12) United States Patent
Labute

(10) Patent No.: US 11,426,657 B2
(45) Date of Patent: Aug. 30, 2022

(54) METHOD AND SYSTEM FOR RETARGETING A HUMAN COMPONENT OF A CAMERA MOTION

(71) Applicant: Unity IPR ApS, Copenhagen (DK)

(72) Inventor: Gregory Labute, Outremont (CA)

(73) Assignee: Unity IPR ApS, Copenhagen (DK)

( * ) Notice: Subject to any disclaimer, the term of this patent is extended or adjusted under 35 U.S.C. 154(b) by 209 days.

(21) Appl. No.: 16/943,923

(22) Filed: Jul. 30, 2020

(65) Prior Publication Data

US 2021/0031104 A1 Feb. 4, 2021

Related U.S. Application Data

(60) Provisional application No. 62/880,385, filed on Jul. 30, 2019.

(51) Int. Cl.
*A63F 13/5258* (2014.01)
*A63F 13/5255* (2014.01)

(52) U.S. Cl.
CPC ...... *A63F 13/5258* (2014.09); *A63F 13/5255* (2014.09); *A63F 2300/6661* (2013.01)

(58) Field of Classification Search
CPC .................. A63F 13/5258; A63F 2300/6661
See application file for complete search history.

(56) References Cited

U.S. PATENT DOCUMENTS

| | | | |
|---|---|---|---|
| 8,594,488 B1* | 11/2013 | Grundmann ... | H04N 21/234345 386/280 |
| 8,964,052 B1* | 2/2015 | Wooley ................... | G06T 13/20 348/211.3 |
| 2013/0182902 A1* | 7/2013 | Holz ...................... | G06F 3/0346 382/103 |
| 2015/0097937 A1* | 4/2015 | Kord ...................... | G06V 40/23 348/77 |
| 2015/0294492 A1* | 10/2015 | Koch ................... | H04N 13/111 345/426 |
| 2018/0359414 A1* | 12/2018 | Wang ....................... | G06T 7/269 |
| 2019/0102950 A1* | 4/2019 | Lu Hill ................. | G06T 19/006 |

* cited by examiner

*Primary Examiner* — James S. McClellan

(74) *Attorney, Agent, or Firm* — Schwegman Lundberg & Woessner, P.A.

(57) ABSTRACT

A method of retargeting camera motion is disclosed. Data is received that describes a position of a target along a target path. Data is received that describes a position and an orientation of a first camera along a first camera path wherein the first camera is filming the target. A second camera path is computed, the second path corresponding to a second camera. The second camera path corresponds to the first camera path with one or more exceptions. The one or more exceptions include one or more of modification of orientation data corresponding to the second camera path to place the target at the center of a camera screen associated with the second camera and removing of a camera rotation roll for the second camera. A difference is computed between the first camera path and the second camera path. The computed difference is applied to a third camera path.

20 Claims, 6 Drawing Sheets

METHOD AND SYSTEM FOR RETARGETING A HUMAN COMPONENT OF A CAMERA MOTION

CROSS-REFERENCE TO RELATED APPLICATIONS

This application claims the benefit of U.S. Provisional Application No. 62/880,385, filed Jul. 30, 2019, which is incorporated by reference herein in its entirety.

TECHNICAL FIELD

The subject matter disclosed herein generally relates to the technical field of camera motion and, in one specific example, to systems and methods for extracting a human component of motion from a recorded camera session.

BACKGROUND OF THE INVENTION

Generating motion capture video or other live video recording is expensive and time consuming, often requiring expensive equipment and facilities along with highly trained personnel. Generating a good shot often requires many takes even for experienced camera operators. Experienced human camera operators can add a human quality to a recorded video if the camera is either fully or partially controlled by the operator. This happens through subtle motions given to the camera by the motion of the operator (e.g., slight jitter from hand movement, a characteristic camera swing from an operator, and other operator specific style movements). After a recording session is complete, the ability to change the recorded camera motion is limited, and often requires an additional recording. In some cases, generating realistic human camera motion with automatic cinematography is difficult, and results often have a mechanical look and feel to them.

BRIEF DESCRIPTION OF THE DRAWINGS

Further features and advantages of example embodiments of the present invention will become apparent from the following detailed description, taken in combination with the appended drawings, in which.

It will be noted that throughout the appended drawings, like features are identified by like reference numerals.

DETAILED DESCRIPTION

Figure 1:
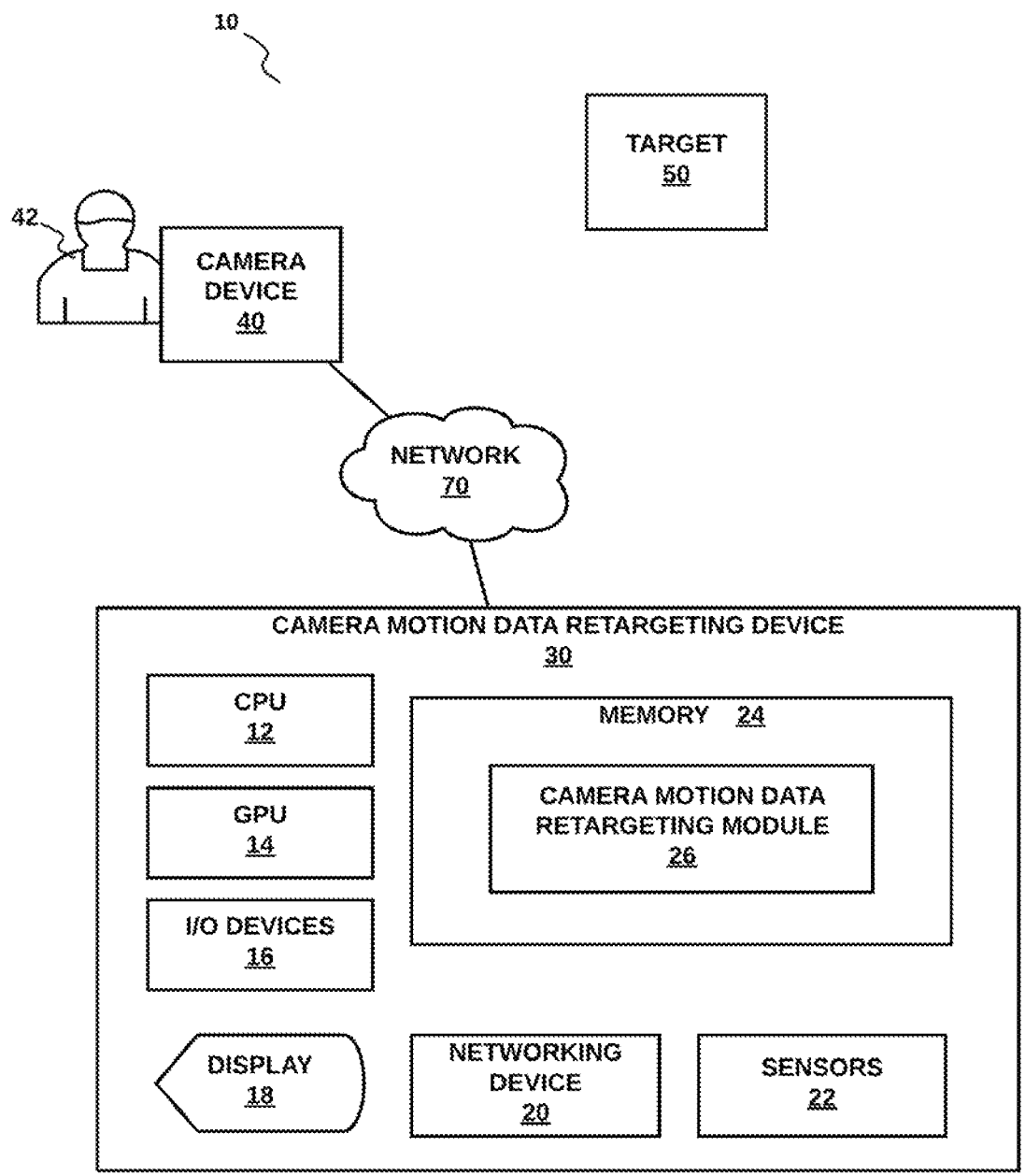
FIG. 1 is a schematic illustrating a camera motion data retargeting system, in accordance with one embodiment.

The description that follows describes example systems, methods, techniques, instruction sequences, and computing machine program products that comprise illustrative embodiments of the disclosure, individually or in combination. In the following description, for the purposes of explanation, numerous specific details are set forth in order to provide an understanding of various embodiments of the inventive subject matter. It will be evident, however, to those skilled in the art, that various embodiments of the inventive subject matter may be practiced without these specific details.

The term 'content' used throughout the description herein should be understood to include all forms of media including images, videos, audio, text, 3d models (e.g., including textures, materials, meshes, and more), animations, vector graphics, and the like.

The term 'game' used throughout the description herein should be understood to include video games and applications that execute and present video games on a device, and applications that execute and present simulations on a device. The term 'game' should also be understood to include programming code (either source code or executable binary code) which is used to create and execute the game on a device.

The term 'environment' used throughout the description herein is understood to include 2D digital environments (e.g., 2D video game environments, 2D simulation environments, 2D content creation environments, and the like), 3D digital environments (e.g., 3D game environments, 3D simulation environments, 3D content creation environment, virtual reality environments, and the like), and augmented reality environments that include both a digital (e.g., virtual) component and a real-world component.

The term 'game object' used herein is understood to include any digital object or digital element within an environment. A game object can represent (e.g., in a corresponding data structure) almost anything within the environment; including 3D models (e.g., characters, weapons, scene elements (e.g., buildings, trees, cars, treasures, and the like)) with 3D model textures, backgrounds (e.g., terrain, sky, and the like), lights, cameras, effects (e.g., sound and visual), animation, and more. The term 'game object' may also be understood to include linked groups of individual game objects. A game object is associated with data that defines properties and behavior for the object.

The terms 'asset', 'game asset', and 'digital asset', used herein are understood to include any data that can be used to describe a game object or can be used to describe an aspect of a digital project (e.g., including: a game, a film, a software application). For example, an asset can include data for an image, a 3D model (textures, rigging, and the like), a group of 3D models (e.g., an entire scene), an audio sound, a video, animation, a 3D mesh and the like. The data describing an asset may be stored within a file, or may be contained within a collection of files, or may be compressed and stored in one file (e.g., a compressed file), or may be stored within a memory. The data describing an asset can be used to instantiate one or more game objects within a game at runtime.

The terms 'client' and 'application client' used herein are understood to include a software client or software application that accesses data and services on a server, including accessing over a network.

In example embodiments, a method for retargeting camera motion is disclosed. Data is received that describes a position of a target along a target path. Data is received that describes a position and orientation of a first camera along a first camera path wherein the first camera is filming the target. A second camera path is computed, the second path corresponding to a second camera. The second camera path corresponds to the first camera path with one or more exceptions. The one or more exceptions include one or more of modification of orientation data corresponding to the second camera path to place the target at the center of a camera screen associated with the second camera and removing of a camera rotation roll for the second camera. A difference is computed between the first camera path and the second camera path. The computed difference is applied to a third camera path.

The present invention includes apparatuses which perform one or more operations or one or more combinations of operations described herein, including data processing systems which perform these operations or methods and computer readable media storing instructions that, when executed on data processing systems, cause the systems to perform these operations or methods, the operations or combinations of operations including non-routine and unconventional operations or combinations of operations.

Turning now to the drawings, systems and methods, including non-routine or unconventional components or operations, or combinations of such components or operations, for camera motion data retargeting in accordance with embodiments of the invention are illustrated. In accordance with an embodiment, the camera motion data retargeting systems and methods described herein take as input data describing a camera path and a target path. The input data describing the camera path includes data describing the position and orientation over time for a camera. The input data describing the target path includes data describing a position of a target for the camera over time. The position of the target may be described relative to the camera position. The target may be a game object and may include animation data (e.g., the target may be in motion).

In accordance with an embodiment, the input data may be generated within a motion capture video recording session. In accordance with another embodiment, the input data may be generated using techniques familiar within the field of computer generated images (CGI) and computer animation.

Figure 2:
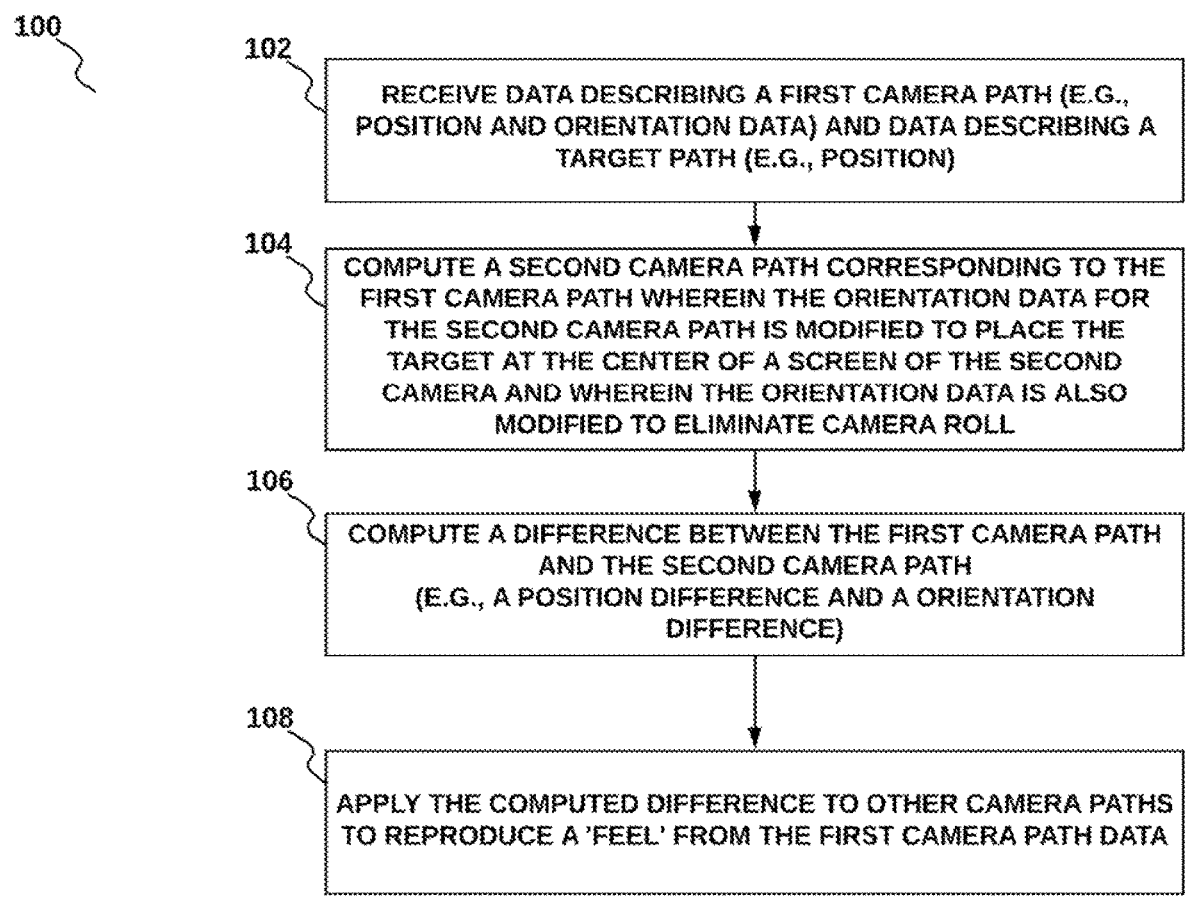
FIG. 2 is a schematic illustrating a method for camera motion data retargeting, in accordance with one embodiment.
Figure 3:
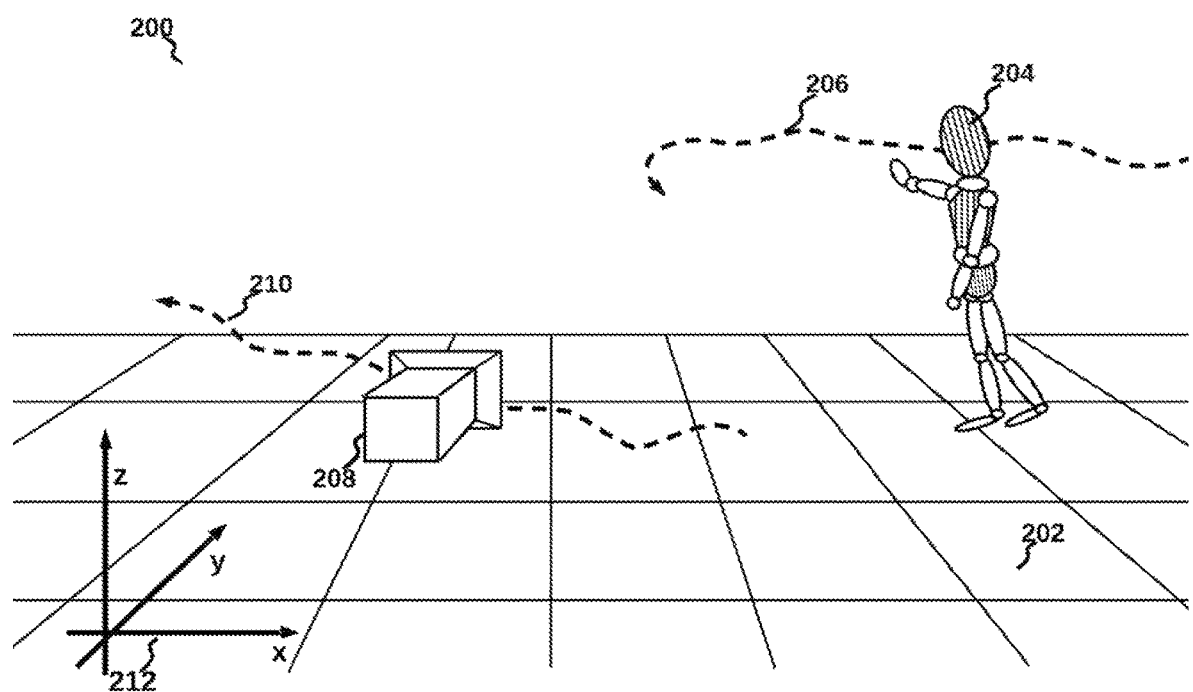
FIG. 3 is a schematic illustrating an environment that includes a camera and a target within a camera motion data retargeting system, in accordance with an embodiment.
Figure 4:
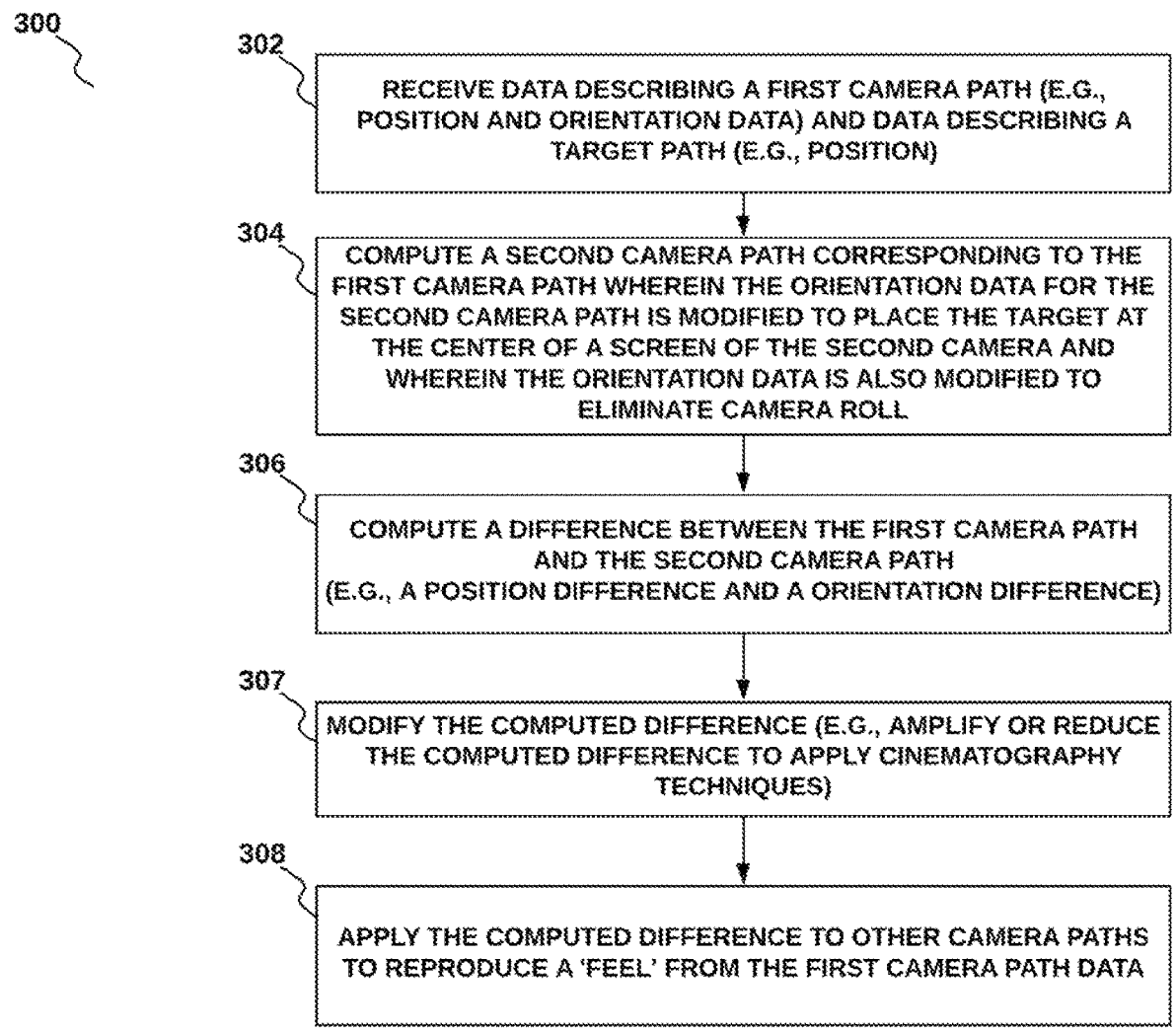
FIG. 4 is a schematic illustrating a method for camera motion data retargeting, in accordance with an embodiment.

In accordance with an embodiment, FIG. 1 is a diagram of an example camera motion data retargeting system 10 configured to provide camera motion data retargeting functionality as described with respect to FIG. 2, FIG. 3, and FIG. 4. The camera motion data retargeting system 10 includes a camera motion data retargeting device 30 and a camera device 40 coupled in networked communication over a network 70 (e.g., a cellular network, a Wi-Fi network, the Internet, and so forth). The camera motion data retargeting system 10 also includes a target 50. In some embodiments, the camera motion data retargeting device 30 may be a mobile computing device, such as a smartphone or a tablet computer, while in other embodiments, the camera motion data retargeting device 30 is a computing device such as a desktop computer or server. In accordance with some embodiments, the camera device 40 may be directly connected to the camera motion data retargeting device 30, or may be integrated within the camera motion data retargeting device 30.

In accordance with an embodiment, the camera device 40 may be configured to capture digital video of an environment (e.g., including the target 50) 40 during operation.

In accordance with an example embodiment, the camera motion data retargeting device 30 includes one or more central processing units (CPUs) 12 and graphics processing units (GPUs) 14. The processing device 12 is any type of processor, processor assembly comprising multiple processing elements (not shown), having access to a memory 24 to retrieve instructions stored thereon, and execute such instructions. Upon execution of such instructions, the instructions implement the processing device 12 to perform a series of tasks as described herein in reference to FIG. 2, FIG. 3, and FIG. 4. The camera motion data retargeting device 30 may also include one or more networking devices 20 (e.g., wired or wireless network adapters) for communicating across the network 70. The camera motion data retargeting device 30 may also include one or more sensors 22, such as a global positioning system (GPS) receiver (e.g., for determining a GPS location of the camera motion data retargeting device 30), biometric sensors (e.g., for capturing biometric data of the operator 42 or target 50), motion or position sensors (e.g., for capturing position data of the camera device 40, the target 50, and the device 30), or an audio microphone (e.g., for capturing sound data).

The camera motion data retargeting device 30 may also include one or more input devices 16 such as, for example, a mouse, a keyboard, a keypad, a touch screen, a microphone, a pointing device, a camera, a hand-held device (e.g., hand motion tracking device), and the like, for inputting information in the form of a data signal readable by the processing device 12. The camera motion data retargeting device 30 may further include one or more display devices 18, such as a touchscreen of a tablet or smartphone, a computer monitor, or lenses or visor of a virtual reality or augmented reality head mounted display, which may be configured to display a video signal from the camera device 40. The display device 18 may be driven or controlled by one or more GPUs 14. The GPU 14 processes aspects of graphical output that assists in speeding up rendering of output through the display device 18.

The camera motion data retargeting device 30 also includes a memory 24 configured to store an camera motion data retargeting module 26. The memory 24 can be any type of memory device, such as random access memory, read only or rewritable memory, internal processor caches, and the like. In accordance with an embodiment, the camera motion data retargeting module 26 may perform operations as described below with respect to FIG. 2, FIG. 3, and FIG. 4.

In accordance with an embodiment, FIG. 2 shows a method 100 for camera motion data retargeting. At operation 102 of the method 100, a camera motion data retargeting module 26 receives input data describing a first camera path (e.g., position data and orientation data) and data describing a target 50 path (e.g., position data). For example, the input data could include data describing a path of a hand-held camera following a moving target, recorded using motion capture technology to help capture path data for the target. As another example, the input data could include data describing a path of a hand-held camera following a moving target 50 without the use of motion capture technology. In accordance with an embodiment, the orientation data may include data describing an orientation of the camera over time in a three-dimensional coordinate space. Similarly, the position data for the first camera path may include data describing a position over time of the camera in a three dimensional coordinate space. In accordance with an embodiment, the position data describing the target 50 path includes data describing a position over time of the target 50 in a three-dimensional coordinate space.

In accordance with an embodiment, the position and orientation data describing the first camera path may be captured with any technology which monitors a position and an orientation over time; including motion capture technology, motion sensors, GPS trackers, RFID tracking, Bluetooth tracking, video tracking via image processing, inertial sensors (e.g., MEMS, gyroscopes), and the like. A device may be placed on a camera in order to determine a position and orientation of the camera.

In accordance with an embodiment, the position data describing the target 50 path may be captured with any technology which monitors a position over time; including motion capture technology, motion sensors, GPS trackers, RFID tracking, Bluetooth tracking, video tracking via image processing, and the like. A tracking device may be placed on a target 50 in order to track a position of the target. In accordance with an embodiment, the target 50 may include any stationary or moving object, or part thereof.

In accordance with an embodiment, at operation 104 of the method 100, the camera motion data retargeting module computes a second camera path for a second camera that includes position and orientation data. The second camera path corresponds to the first camera path wherein the orientation data is modified to place the target 50 at the exact center of a camera screen of the second camera (e.g., a camera screen associated with the second camera placed at the position of the first camera path). In accordance with an embodiment, the orientation data for the second camera is modified to eliminate roll from the orientation data of the first camera. The roll being a rotation around the optical axis of the second camera leading to a clockwise or counter clockwise rotation a view seen through the camera (e.g., with pan and tilt being rotation around axes orthogonal to the optical axis). In accordance with an embodiment, the second camera path has the same position values as the first camera path but with different orientation values.

In accordance with an embodiment, as part of operation 104, the orientation data is modified for each point along the first path for which there is associated data (e.g., along each point of the first camera path).

In accordance with an embodiment, the second camera may be a virtual camera.

In accordance with an embodiment, at operation 106 of the method 100, the camera motion data retargeting module 26 computes a difference between the first camera path and the second camera path. In example embodiments, this computed difference represents human movement that is extracted from the first camera path. For example, the computed difference can include a position difference and an orientation difference. The resulting computed difference includes a recording of camera rotations along three orthogonal axes (e.g., x, y, and z axes) that may represent subtle hand-held motions from a human (e.g., a professional videographer) that are included in the first camera path position and orientation data. For example, the computed difference may be able to extract subtle human motions from a recorded video shot which may differentiate the shot from a mechanical shot of the same subject (e.g., a shot created with a rigid or mechanically controlled camera rig). The extracted subtle motions within the computed difference may incorporate cinematographic style.

In accordance with an embodiment, at operation 108 of the method 100, the camera motion data retargeting module 26 applies the computed difference to a third camera on a third camera path (e.g., the third camera path including position and orientation data). The application of the computed difference to the third camera path may reproduce a look and feel from the first camera path data related to the subtle hand-help motions extracted in operation 106. In accordance with an embodiment, the application of the computed difference to the third virtual camera path includes adding the computed difference values to position and/or orientation data for the third camera path at corresponding positions along the path. For example, a computed difference of rotation (e.g., orientation) may be added to orientation data for the third camera path. In accordance with an embodiment, a computed difference of position is not added to the third camera path. In accordance with an embodiment, operation 108 is performed after other shot composition, camera motion, and target motion effects are applied to the third camera (e.g., in order not to have the computed difference erased by the application of the effects).

In accordance with an embodiment, FIG. 3 is an illustration of a recording environment 200 that can be used to perform the method 100 described in FIG. 2. In accordance with an embodiment, the environment 200 includes a target 204 (e.g., the head of a human actor) traveling a target path 206 (e.g., as the human actor walks on a surface 202 in the environment 200). In accordance with an embodiment, the target 204 may be similar to the target 50 shown in FIG. 1. There is also a camera 208 filming the target 204, whereby the camera 208 moves along a camera path 210. In accordance with an embodiment, the camera 208 may be similar to the camera device 40 shown in FIG. 1. Although not shown in FIG. 3 for ease of illustration, the camera 208 may be held and moved along the camera path 210 by a human operator. In accordance with an embodiment, the camera path 210 and the target path 206 may be determined in a coordinate system 212.

In accordance with an embodiment, the camera motion data retargeting systems and methods described herein may allow for an adjustment of an input camera path position in relation to a position of a target 50 (e.g., resulting in a view from a different angle) while preserving a characteristic "feel" of the original camera shot (e.g., wherein the characteristic "feel" includes all subtle motion of a camera included in a computed difference as determined in operation 106), and without having to re-take (e.g., re-shoot) a camera operator's performance (e.g., without re-recording the input camera path data). For example, using a camera motion data retargeting system 10 and employing the method 100 described in FIG. 2 on a camera 208 (e.g., on an original camera path) and a target 204 for the camera 208, a view from the camera 208 along the camera path may be modified (e.g., made to appear closer to the target 204, or farther from the target 204, or more to the left of the target 204, or the like) while maintaining a look and feel from the original camera path due to a determination of a computed difference (e.g., in operation 106) and an application of the computed difference to a separate camera path (e.g., in operation 108).

In accordance with an embodiment, the camera motion data retargeting systems and methods described herein may allow for an adjustment of an input camera orientation in relation to the target 50 resulting in a modification of an on-screen position of the target all while preserving a characteristic "feel" of the original camera shot (e.g., wherein the characteristic "feel" includes all subtle motion of a camera included in a computed difference as determined in operation 106)), and without having to re-take (e.g., re-shoot) a camera operator's performance (e.g., without re-recording the input camera path data). For example, using a camera motion data retargeting system 10 and employing the method 100 described in FIG. 2 on a camera 208 (e.g., on an original camera path) and a target 204 for the camera 208, a view from the camera 208 along the camera path may be modified (e.g., the target 204 can be made to appear higher or lower on the screen, or more to the left or right, or the like) while maintaining a look and feel from the original camera 208 due to a determination of a computed difference (e.g., in operation 106) and an application of the computed difference to a separate camera path with modified orientation data (e.g., in operation 108).

In accordance with an embodiment, the camera motion data retargeting systems and methods described herein may allow for a replacement of a first target within the input data (e.g., an original target used while recording a shot) with a second target unrelated to the first target while preserving a characteristic "feel" of an original camera shot (e.g., wherein the characteristic "feel" includes subtle motion of a camera included in a computed difference as determined in operation 106), and without having to re-take (e.g., re-shoot) a camera operator's performance (e.g., without re-recording the input camera path data). For example, the first target (e.g., a first game object) may be replaced with a second target (e.g., a second game object) different than the first target but with the second target using the same animation data from the first target included in the input data (e.g., a camera following a first game object named 'Peter' can be changed to follow a second game object named 'Jane' while preserving camera motion subtleties extracted during operation 106). As another example, animation data for the first target can be changed (e.g., a camera following a first animation or video take of 'Peter' can be used to follow an alternate animation or video take of 'Peter' while preserving camera motion subtleties extracted during operation 106).

In accordance with an embodiment, FIG. 4 shows a camera motion data retargeting method 300 which is similar to the camera motion data retargeting method 100 described in FIG. 2. For example, operation 302, 304, 306, and 308 of the method 300 may be similar to operation 102, 104, 106, and 108 of the method 100, respectively. In accordance with an embodiment, the method 300 shown in FIG. 4 includes operation 307 wherein the computed difference is modified prior to being applied to other camera paths. The modification may include amplifying (or reducing) an amount of the computed difference in order to amplify (or reduce) a rotation or position associated with the computed difference. In accordance with an embodiment, operation 307 may include an analysis of the computed difference to determine data within the computed difference which may be associated with one or more predefined cinematographic movement types (e.g., such as dutch roll); and modifying the determined data associated with a cinematographic movement type prior to applying the computed difference data to other camera paths (e.g., to increase or reduce a determined dutch roll within the computed difference). In accordance with an embodiment, operation 307 may include modifying a position difference within the computed difference separately from modifying an orientation difference.

In accordance with an embodiment, the camera motion data retargeting method 300 described with respect to FIG. 4 may allow for a modification of an amplitude of value within the data describing a hand-held quality of a shot within the input data (e.g., less dutch, more vertical shake, etc.) all while preserving a characteristic "feel" of the original camera shot (e.g., wherein the characteristic "feel" includes subtle motion of a camera included in a computed difference as determined in operation 306), and without having to re-take (e.g., re-shoot) a camera operator's performance (e.g., without re-recording the input camera path data).

Preserving a characteristic "feel" of an original camera shot (e.g., from data within the input data wherein the characteristic "feel" includes subtle motion of a camera included in a computed difference as determined in operation 106 and 306), and without having to re-take (e.g., re-shoot) a camera operator's performance (e.g., without re-recording the camera shot) greatly enhances value and scope of a camera performance, thereby allowing increased creative freedom in post-production. The camera motion data retargeting systems and methods described herein are powerful because they allow a movie director to tweak shots in post-production without going back to modify or redo expensive motion capture sessions or video recording sessions.

While illustrated in the block diagrams as groups of discrete components communicating with each other via distinct data signal connections, it will be understood by those skilled in the art that the various embodiments may be provided by a combination of hardware and software components, with some components being implemented by a given function or operation of a hardware or software system, and many of the data paths illustrated being implemented by data communication within a computer application or operating system. The structure illustrated is thus provided for efficiency of teaching the present various embodiments.

It should be noted that the present disclosure can be carried out as a method, can be embodied in a system, a computer readable medium or an electrical or electro-magnetic signal. The embodiments described above and illustrated in the accompanying drawings are intended to be exemplary only. It will be evident to those skilled in the art that modifications may be made without departing from this disclosure. Such modifications are considered as possible variants and lie within the scope of the disclosure.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or with any suitable combination thereof. For example, a hardware module may include dedicated circuitry or logic that is permanently configured to perform certain operations. For example, a hardware module may be a special-purpose processor, such as a field-programmable gate array (FPGA) or an Application Specific Integrated Circuit (ASIC). A hardware module may also include programmable logic or circuitry that is temporarily configured by software to perform certain operations. For example, a hardware module may include software encompassed within a general-purpose processor or other programmable processor. Such software may at least temporarily transform the general-purpose processor into a special-purpose processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Figure 5:
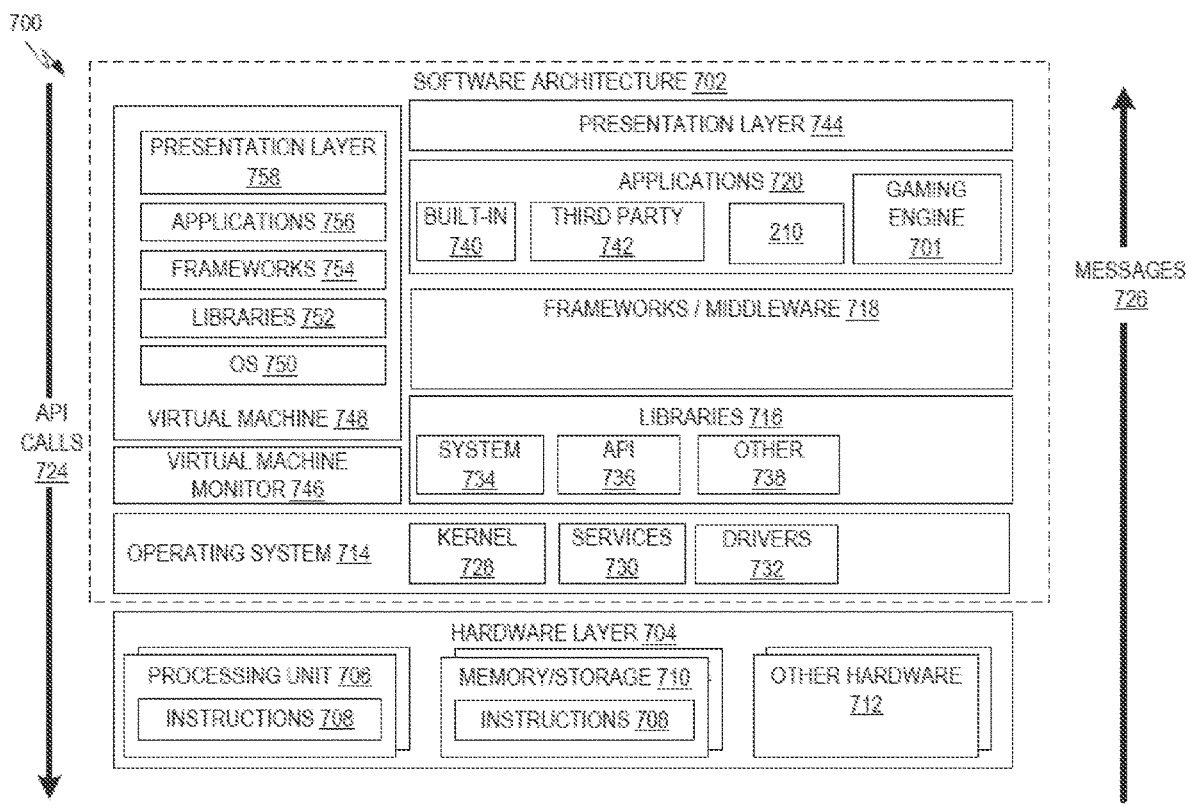
FIG. 5 is a block diagram illustrating an example software architecture, which may be used in conjunction with various hardware architectures described herein.

FIG. 5 is a block diagram 700 illustrating an example software architecture 702, which may be used in conjunction with various hardware architectures herein described to provide a gaming engine 701 and/or components of the camera motion data retargeting system 10. FIG. 5 is a non-limiting example of a software architecture and it will be appreciated that many other architectures may be implemented to facilitate the functionality described herein. The software architecture 702 may execute on hardware such as a machine 800 of FIG. 6 that includes, among other things, processors 810, memory 830, and input/output (I/O) components 850. A representative hardware layer 704 is illustrated and can represent, for example, the machine 800 of FIG. 6. The representative hardware layer 704 includes a processing unit 706 having associated executable instructions 708. The executable instructions 708 represent the executable instructions of the software architecture 702, including implementation of the methods, modules and so forth described herein. The hardware layer 704 also includes memory/storage 710, which also includes the executable instructions 708. The hardware layer 704 may also comprise other hardware 712.

In the example architecture of FIG. 5, the software architecture 702 may be conceptualized as a stack of layers where each layer provides particular functionality. For example, the software architecture 702 may include layers such as an operating system 714, libraries 716, frameworks or middleware 718, applications 720 and a presentation layer 744. Operationally, the applications 720 and/or other components within the layers may invoke application programming interface (API) calls 724 through the software stack and receive a response as messages 726. The layers illustrated are representative in nature and not all software architectures have all layers. For example, some mobile or special purpose operating systems may not provide the frameworks/middleware 718, while others may provide such a layer. Other software architectures may include additional or different layers.

The operating system 714 may manage hardware resources and provide common services. The operating system 714 may include, for example, a kernel 728, services 730, and drivers 732. The kernel 728 may act as an abstraction layer between the hardware and the other software layers. For example, the kernel 728 may be responsible for memory management, processor management (e.g., scheduling), component management, networking, security settings, and so on. The services 730 may provide other common services for the other software layers. The drivers 732 may be responsible for controlling or interfacing with the underlying hardware. For instance, the drivers 732 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 716 may provide a common infrastructure that may be used by the applications 720 and/or other components and/or layers. The libraries 716 typically provide functionality that allows other software modules to perform tasks in an easier fashion than to interface directly with the underlying operating system 714 functionality (e.g., kernel 728, services 730 and/or drivers 732). The libraries 816 may include system libraries 734 (e.g., C standard library) that may provide functions such as memory allocation functions, string manipulation functions, mathematic functions, and the like. In addition, the libraries 716 may include API libraries 736 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 716 may also include a wide variety of other libraries 738 to provide many other APIs to the applications 720 and other software components/modules.

The frameworks 718 (also sometimes referred to as middleware) provide a higher-level common infrastructure that may be used by the applications 720 and/or other software components/modules. For example, the frameworks/middleware 718 may provide various graphic user interface (GUI) functions, high-level resource management, high-level location services, and so forth. The frameworks/middleware 718 may provide a broad spectrum of other APIs that may be utilized by the applications 720 and/or other software components/modules, some of which may be specific to a particular operating system or platform.

The applications 720 include built-in applications 740 and/or third-party applications 742. Examples of representative built-in applications 740 may include, but are not limited to, a contacts application, a browser application, a book reader application, a location application, a media application, a messaging application, and/or a game application. Third-party applications 742 may include any an application developed using the Android™ or iOS™ software development kit (SDK) by an entity other than the vendor of the particular platform, and may be mobile software running on a mobile operating system such as iOS™, Android™, Windows® Phone, or other mobile operating systems. The third-party applications 742 may invoke the API calls 724 provided by the mobile operating system such as operating system 714 to facilitate functionality described herein.

The applications 720 may use built-in operating system functions (e.g., kernel 728, services 730 and/or drivers 732), libraries 716, or frameworks/middleware 718 to create user interfaces to interact with users of the system. Alternatively, or additionally, in some systems, interactions with a user may occur through a presentation layer, such as the presentation layer 744. In these systems, the application/module "logic" can be separated from the aspects of the application/module that interact with a user.

Some software architectures use virtual machines. In the example of FIG. 5, this is illustrated by a virtual machine 748. The virtual machine 748 creates a software environment where applications/modules can execute as if they were executing on a hardware machine (such as the machine 800 of FIG. 6, for example). The virtual machine 748 is hosted by a host operating system (e.g., operating system 714) and typically, although not always, has a virtual machine monitor 746, which manages the operation of the virtual machine 748 as well as the interface with the host operating system (i.e., operating system 714). A software architecture executes within the virtual machine 748 such as an operating system (OS) 750, libraries 752, frameworks 754, applications 756, and/or a presentation layer 758. These layers of software architecture executing within the virtual machine 748 can be the same as corresponding layers previously described or may be different.

Figure 6:
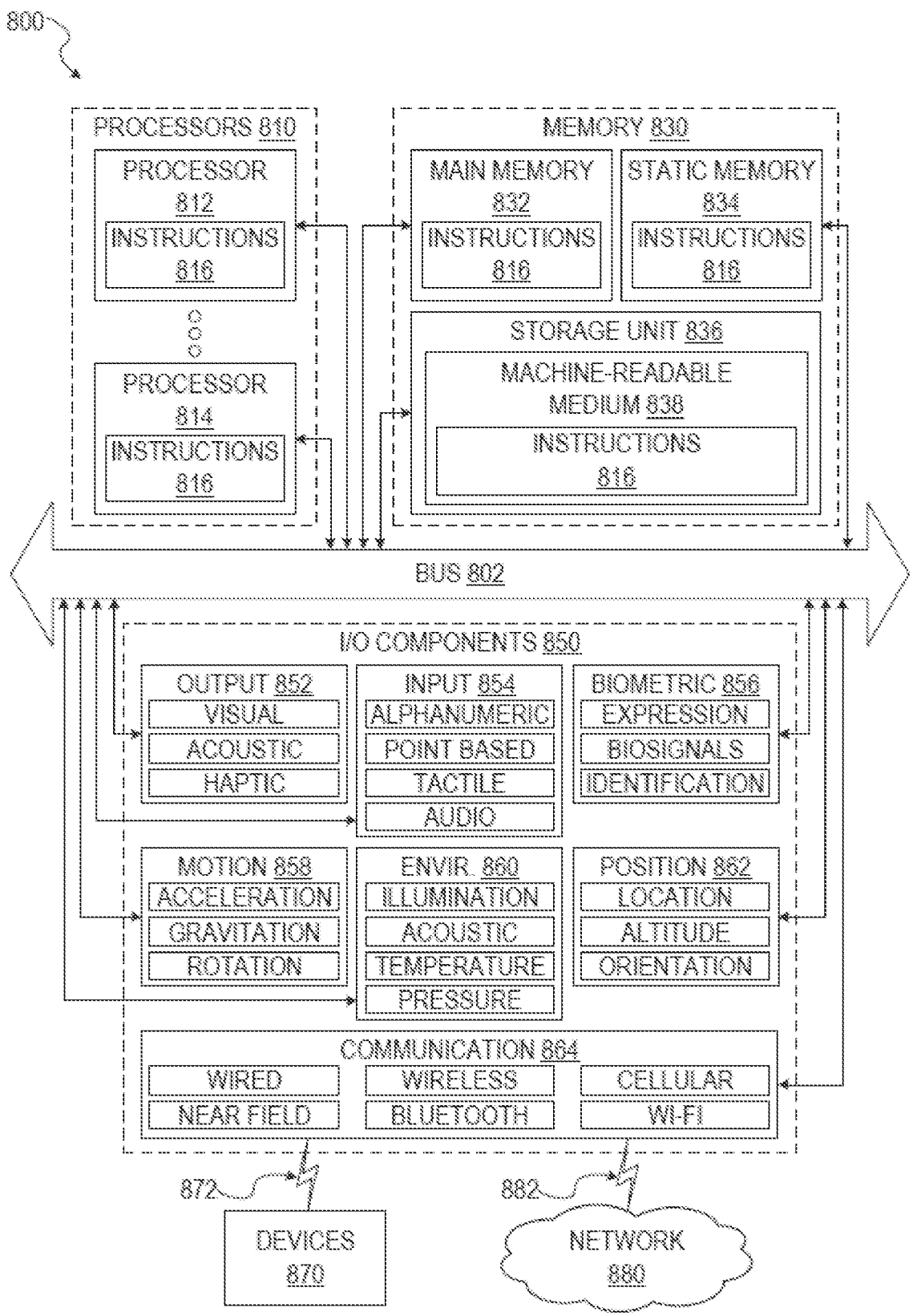
FIG. 6 is a block diagram illustrating components of a machine, according to some example embodiments, configured to read instructions from a machine-readable medium (e.g., a machine-readable storage medium) and perform any one or more of the methodologies discussed herein.

FIG. 6 is a block diagram illustrating components of a machine 800, according to some example embodiments, configured to read instructions from a machine-readable medium (e.g., a machine-readable storage medium) and perform any one or more of the methodologies discussed herein. In some embodiments, the machine 110 is similar to the HMD 102. Specifically, FIG. 6 shows a diagrammatic representation of the machine 800 in the example form of a computer system, within which instructions 816 (e.g., software, a program, an application, an applet, an app, or other executable code) for causing the machine 800 to perform any one or more of the methodologies discussed herein may be executed. As such, the instructions 816 may be used to implement modules or components described herein. The instructions transform the general, non-programmed machine into a particular machine programmed to carry out the described and illustrated functions in the manner described. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 816, sequentially or otherwise, that specify actions to be taken by the machine 800. Further, while only a single machine 800 is illustrated, the term "machine" shall also be taken to include a collection of machines that individually or jointly execute the instructions 816 to perform any one or more of the methodologies discussed herein.

The machine 800 may include processors 810, memory 830, and input/output (I/O) components 850, which may be configured to communicate with each other such as via a bus 802. In an example embodiment, the processors 810 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 812 and a processor 814 that may execute the instructions 816. The term "processor" is intended to include multi-core processor that may comprise two or more independent processors (sometimes referred to as "cores") that may execute instructions contemporaneously. Although FIG. 6 shows multiple processors, the machine 800 may include a single processor with a single core, a single processor with multiple cores (e.g., a multi-core processor), multiple processors with a single core, multiple processors with multiples cores, or any combination thereof.

The memory/storage 830 may include a memory, such as a main memory 832, a static memory 834, or other memory, and a storage unit 836, both accessible to the processors 810 such as via the bus 802. The storage unit 836 and memory 832, 834 store the instructions 816 embodying any one or more of the methodologies or functions described herein. The instructions 816 may also reside, completely or partially, within the memory 832, 834, within the storage unit 836, within at least one of the processors 810 (e.g., within the processor's cache memory), or any suitable combination thereof, during execution thereof by the machine 800. Accordingly, the memory 832, 834, the storage unit 836, and the memory of processors 810 are examples of machine-readable media 838.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store the instructions 816. The term "machine-readable medium" shall also be taken to include any medium, or combination of multiple media, that is capable of storing instructions (e.g., instructions 816) for execution by a machine (e.g., machine 800), such that the instructions, when executed by one or more processors of the machine 800 (e.g., processors 810), cause the machine 800 to perform any one or more of the methodologies or operations, including non-routine or unconventional methodologies or operations, or non-routine or unconventional combinations of methodologies or operations, described herein. Accordingly, a "machine-readable medium" refers to a single storage apparatus or device, as well as "cloud-based" storage systems or storage networks that include multiple storage apparatus or devices. The term "machine-readable medium" excludes signals per se.

The input/output (I/O) components 850 may include a wide variety of components to receive input, provide output, produce output, transmit information, exchange information, capture measurements, and so on. The specific input/output (I/O) components 850 that are included in a particular machine will depend on the type of machine. For example, portable machines such as mobile phones will likely include a touch input device or other such input mechanisms, while a headless server machine will likely not include such a touch input device. It will be appreciated that the input/output (I/O) components 850 may include many other components that are not shown in FIG. 6. The input/output (I/O) components 850 are grouped according to functionality merely for simplifying the following discussion and the grouping is in no way limiting. In various example embodiments, the input/output (I/O) components 850 may include output components 852 and input components 854. The output components 852 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 854 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the input/output (I/O) components 850 may include biometric components 856, motion components 858, environmental components 860, or position components 862, among a wide array of other components. For example, the biometric components 856 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 858 may include acceleration sensor components (e.g., accelerometer), gravitation sensor components, rotation sensor components (e.g., gyroscope), and so forth. The environmental components 860 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 862 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The input/output (I/O) components 850 may include communication components 864 operable to couple the machine 800 to a network 880 or devices 870 via a coupling 882 and a coupling 872 respectively. For example, the communication components 864 may include a network interface component or other suitable device to interface with the network 880. In further examples, the communication components 864 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 870 may be another machine or any of a wide variety of peripheral devices (e.g., a peripheral device coupled via a Universal Serial Bus (USB)).

Moreover, the communication components 864 may detect identifiers or include components operable to detect identifiers. For example, the communication components 864 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 862, such as, location via Internet Protocol (IP) geo-location, location via Wi-Fi® signal triangulation, location via detecting a NFC beacon signal that may indicate a particular location, and so forth.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within the scope of embodiments of the present disclosure as represented by the appended claims. The specification and drawings are, accordingly, to be regarded in an illustrative rather than a restrictive sense.

The invention claimed is:

1. A system comprising:
   one or more computer processors;
   one or more computer memories; and
   a set of instructions incorporated into the one or more computer memories, the set of instructions configuring the one or more computer processors to perform operations for retargeting camera motion, the operations comprising:
   receiving data describing a position of a target along a target path;
   receiving data describing a position and an orientation of a first camera along a first camera path wherein the first camera is filming the target;
   computing a second camera path for a second camera, the second camera path corresponding to the first camera path, wherein orientation data corresponding to the second camera path is modified to place the target at the center of a camera screen associated with the second camera and removing a camera rotation roll for the second camera;
   computing a difference between the first camera path and the second camera path; and
   applying the computed difference to a third camera path.

2. The system of claim 1, wherein a movement of the first camera along the first camera path is controlled by a human.

3. The system of claim 1, wherein the third camera path is generated by an automated cinematography system or an artificial intelligence agent, and is associated with a third camera filming the target.

4. The system of claim 1, wherein the computed difference is amplified or reduced before being applied to the third camera path.

5. The system of claim 4, the operations further comprising:
   separating the computed difference into a computed orientation difference and a computed displacement difference;
   modifying one or more of the computed orientation difference and the computed displacement difference prior to applying the modification to the third camera path.

6. The system of claim 1, the operations further comprising:
   analyzing and decomposing the computed difference into data associated with one or more predetermined cinematographic movement types; and
   modifying decomposed data associated with a cinematographic movement type of the one or more predetermined cinematographic movement types prior to applying the data to the third camera path.

7. The system of claim 1, wherein the camera roll is removed by applying a clockwise or counter clockwise rotation to the orientation data associated with the optical axis of the first camera path.

8. A non-transitory computer-readable storage medium storing a set of instructions that, when executed by one or more processors, cause the one or more processors to perform operations for retargeting camera motion, the operations comprising:
   receiving data describing a position of a target along a target path;
   receiving data describing a position and an orientation of a first camera along a first camera path wherein the first camera is filming the target;
   computing a second camera path for a second camera, the second camera path corresponding to the first camera path, wherein orientation data corresponding to the second camera path is modified to place the target at the center of a camera screen associated with the second camera and removing a camera rotation roll for the second camera;
   computing a difference between the first camera path and the second camera path; and
   applying the computed difference to a third camera path.

9. The non-transitory computer-readable storage medium of claim 8, wherein a movement of the first camera along the first camera path is controlled by a human.

10. The non-transitory computer-readable storage medium of claim 8, wherein the third camera path is generated by an automated cinematography system or an artificial intelligence agent, and is associated with a third camera filming the target.

11. The non-transitory computer-readable storage medium of claim 8, wherein the computed difference is amplified or reduced before being applied to the third camera path.

12. The non-transitory computer-readable storage medium of claim 11, the operations further comprising:
- separating the computed difference into a computed orientation difference and a computed displacement difference;
- modifying one or more of the computed orientation difference and the computed displacement difference prior to applying the modification to the third camera path.

13. The non-transitory computer-readable storage medium of claim 8, the operations further comprising:
- analyzing and decomposing the computed difference into data associated with one or more predetermined cinematographic movement types; and
- modifying decomposed data associated with a cinematographic movement type of the one or more predetermined cinematographic movement types prior to applying the data to the third camera path.

14. The non-transitory computer-readable storage medium of claim 8, wherein the camera roll is removed by applying a clockwise or counter clockwise rotation to the orientation data associated with the optical axis of the first camera path.

15. A method comprising:
- performing, using one or more computer processors, operations for retargeting camera motion, the operations comprising:
- receiving data describing a position of a target along a target path;
- receiving data describing a position and an orientation of a first camera along a first camera path wherein the first camera is filming the target;
- computing a second camera path for a second camera, the second camera path corresponding to the first camera path, wherein orientation data corresponding to the second camera path is modified to place the target at the center of a camera screen associated with the second camera and removing a camera rotation roll for the second camera;
- computing a difference between the first camera path and the second camera path; and
- applying the computed difference to a third camera path.

16. The method of claim 15, wherein a movement of the first camera along the first camera path is controlled by a human.

17. The method of claim 15, wherein the third camera path is generated by an automated cinematography system or an artificial intelligence agent, and is associated with a third camera filming the target.

18. The method of claim 15, wherein the computed difference is amplified or reduced before being applied to the third camera path.

19. The method of claim 18, the operations further comprising:
- separating the computed difference into a computed orientation difference and a computed displacement difference;
- modifying one or more of the computed orientation difference and the computed displacement difference prior to applying the modification to the third camera path.

20. The method of claim 15, the operations further comprising:
- analyzing and decomposing the computed difference into data associated with one or more predetermined cinematographic movement types; and
- modifying decomposed data associated with a cinematographic movement type of the one or more predetermined cinematographic movement types prior to applying the data to the third camera path.

* * * * *